United States Patent
Nakanishi et al.

(10) Patent No.: US 6,464,755 B2
(45) Date of Patent: Oct. 15, 2002

(54) GAS SEPARATION MEMBRANE AND METHOD FOR ITS USE

(75) Inventors: Shunsuke Nakanishi, Tokyo; Toshimune Yoshinaga, Ichihara; Kenji Ito, Ichihara; Yoshihiro Kusuki, Ichihara, all of (JP)

(73) Assignee: Ube Industries, Ltd., Ube (JP)

( * ) Notice: Subject to any disclaimer, the term of this patent is extended or adjusted under 35 U.S.C. 154(b) by 0 days.

(21) Appl. No.: 09/766,116

(22) Filed: Jan. 19, 2001

(65) Prior Publication Data

US 2002/0035922 A1 Mar. 28, 2002

(30) Foreign Application Priority Data

Jan. 19, 2000 (JP) .................................. 2000-009877
Apr. 26, 2000 (JP) .................................. 2000-125587
Dec. 5, 2000 (JP) .................................. 2000-370031

(51) Int. Cl.[7] .............................................. B01D 53/22
(52) U.S. Cl. ..................... 95/52; 96/8; 96/10; 96/14
(58) Field of Search ............................ 95/45, 52; 96/4, 96/8, 10, 13, 14

(56) References Cited

U.S. PATENT DOCUMENTS

| | | | | |
|---|---|---|---|---|
| 4,783,201 A | * | 11/1988 | Rice et al. ...................... | 95/52 |
| 4,832,713 A | * | 5/1989 | Yamada et al. ................. | 96/13 |
| 4,875,908 A | * | 10/1989 | Kikukawa et al. ............. | 95/52 |
| 4,900,626 A | * | 2/1990 | Fabre ......................... | 95/52 X |
| 4,968,331 A | * | 11/1990 | Sakashita et al. ........... | 96/14 X |
| 5,007,944 A | | 4/1991 | Pinnau et al. ................. | 55/16 |
| 5,034,025 A | | 7/1991 | Overmann ..................... | 55/16 |
| 5,055,116 A | | 10/1991 | Kohn et al. .................... | 55/16 |
| 5,071,452 A | * | 12/1991 | Avrillon et al. ............. | 95/52 X |
| 5,076,816 A | * | 12/1991 | Avrillon et al. ............. | 95/52 X |
| 5,084,073 A | * | 1/1992 | Prasad ........................ | 95/52 |
| 5,108,464 A | | 4/1992 | Friesen et al. ................ | 55/16 |
| 5,234,471 A | * | 8/1993 | Weinberg ................... | 95/52 X |
| 5,248,319 A | | 9/1993 | Ekiner et al. ................. | 95/54 |
| 5,286,539 A | * | 2/1994 | Kusuki et al. .............. | 96/13 X |
| 5,608,014 A | | 3/1997 | Ekiner ........................ | 525/432 |
| 5,817,165 A | * | 10/1998 | Hachisuka et al. ......... | 96/13 X |
| 5,882,382 A | | 3/1999 | Hachisuka et al. ............ | 96/13 |
| 5,917,137 A | | 6/1999 | Ekiner ........................ | 96/10 |
| 5,928,410 A | * | 7/1999 | Jois et al. ................... | 96/14 X |
| 6,210,464 B1 | * | 4/2001 | Nakanishi et al. ............. | 95/52 |

FOREIGN PATENT DOCUMENTS

| | | | | |
|---|---|---|---|---|
| JP | 63-209730 A | * | 8/1988 | ................ 95/52 |
| JP | 2-099114 A | * | 4/1990 | ................ 95/52 |
| JP | 02-222717 | | 9/1990 | |

OTHER PUBLICATIONS

European Search Report for EP 01 10 0017.
Japanese Patent Abstract corresponding to JP–A–02222717.

* cited by examiner

*Primary Examiner*—Robert H. Spitzer
(74) *Attorney, Agent, or Firm*—Morgan Lewis & Bockius LLP

(57) ABSTRACT

An asymmetric membrane is formed using a mixture of two or more different polymers including at least one type of polyimide. It is thereby possible to produce a gas separation membrane with low permeation resistance (a high permeation rate) for permeate gases passing through the porous layer of the membrane, which also maintains a practical level of mechanical strength of the membrane and has excellent water resistance and hot water resistance.

8 Claims, No Drawings

GAS SEPARATION MEMBRANE AND METHOD FOR ITS USE

BACKGROUND OF THE INVENTION

1. Field of the Invention

The present invention relates to a gas separation membrane with an asymmetric structure composed of a skin layer and a porous layer, the gas separation membrane being characterized in that the membrane permeation rate of the permeate gas (membrane permeating component) is increased by lowering the resistance of the permeate gas as it permeates the porous layer, and in that it has at least a practical level of mechanical strength as a hollow fiber gas separation membrane. The invention further relates to a gas separation membrane with excellent water resistance and hot water resistance. The invention still further relates to a dehumidification method and a humidification method characterized by employing the aforementioned gas separation membrane.

2. Description of the Related Art

Gas separation membranes are used in a variety of gas separation methods. Most of them are formed of glassy polymers that have high selectivity. Generally speaking, glassy polymers have high selectivity (degree of separation), but have the drawback of a low gas permeation coefficient. Most gas separation membranes formed of glassy polymers are therefore used with an asymmetric structure composed of a porous layer (support layer) and a thin skin layer (selective layer), i.e., the selective layer that produces permeation resistance against the gas is reduced in thickness so that the gas permeation rate is not too low.

Gas separation membranes are generally used as hollow fiber gas separation membrane modules constructed by bundling a large number of hollow fiber membranes (for example, from a hundred to a few hundred thousand) into a hollow fiber bundle, and anchoring at least one end of the hollow fiber bundle with a thermosetting resin such as an epoxy resin or with a thermoplastic resin, in such a manner that the hollow fiber membrane is open at that end, to construct a hollow fiber separation membrane element, and then inserting one or a plurality of these hollow fiber separation membrane elements into a container with at least a mixed gas inlet, a permeating gas outlet and a non-permeating gas outlet in a manner which partitions the space passing inside the hollow fiber membranes from the space passing outside the hollow fiber membranes. In hollow fiber gas separation membrane modules, the mixed-gas is supplied to the space contacting the inside or outside of the hollow fiber membranes, and specific components (permeate gases) in the mixed gas selectively permeate the membrane while it flows in contact with the hollow fiber membranes and are recovered through the permeating gas outlet, while the gas depleted of those specific components (permeate gases) is recovered through the non-permeating gas outlet, thus accomplishing gas separation.

As concerns gas separation membranes made of polymer blends, U.S. Pat. No. 5,055,116 discloses a gas separation membrane comprising a blend of two different polyimides with specific molecular structures, and it shows that the permeation rate for oxygen and nitrogen can be linearly controlled by the polyimide blend ratio. Also, U.S. Pat. No. 5,248,319 discloses a gas separation membrane comprising a blend of a polyimide with a phenylindane residue and a specific polyimide, polyamide or polyamideimide. U.S. Pat. No. 5,608,014 discloses a gas separation membrane comprising a blend of a specific polyethersulfone, a specific aromatic polyimide and a specific aromatic polyimide or polyamide or polyamideimide, and U.S. Pat. No. 5,917,137 discloses a gas separation membrane comprising a blend of a specific polyethersulfone and a specific aromatic polyimide. These publications, however, do not mention the water vapor permeation rate or the gas permeation resistance of the porous layer. They also contain no disclosure or suggestion regarding a gas separation membrane with a very high water vapor permeation rate while also having mechanical strength suitable for practical use as an asymmetric hollow fiber membrane in an industrial module.

Water resistance and hot water resistance are important properties for dehumidifying membranes and humidifying membranes. However, membranes with improved permeation rates for gases containing water vapor have often exhibited inferior water resistance and hot water resistance. Japanese Unexamined Patent Publication No. 2-222717 discloses a polyimide separation membrane with excellent water resistance and hot water resistance, but it is used for the dewatering of organic vapor and has a low water vapor permeation rate.

For membranes with asymmetric structures, the rate-determining parameter of the permeation rate at which the permeate gas passes through the membrane is the process by which the permeate gas passes through the skin layer of the membrane. In the process in which the permeate gas passes through the porous layer of the membrane, there is a relatively low permeation resistance. In most cases, therefore, it is possible to substantially ignore the effect, on the process, that the permeate gas passing through the porous layer of the membrane has on the permeation rate.

However, in cases where the skin layer is exceedingly thin so that the permeation rate at which the permeate gas passes through the membrane is very high, or in cases where the membrane permeating component is a gas that permeates very easily through the membrane, the permeation rate at which the permeate gas passes through the membrane is sometimes notably affected by the rate of the permeate gas passing through the porous layer. In such cases, a membrane with an asymmetric-structure can still be improved in the permeation rate at which the permeate gas passes through the membrane, and efforts have been made to develop a more compact, high performance gas separation membrane with higher efficiency through such an improvement. When the component passing through the membrane is water vapor, since water vapor has a much higher permeation rate through membranes than other inorganic gases (from a few hundred times to a few thousand times greater), the permeation rate of water vapor through the membrane is particularly affected by the permeation resistance of the porous layer. Consequently, it has been considered that reducing the permeation resistance for passage of water vapor through the porous layer could increase the permeation rate of water vapor passing through the membrane, and efforts have been made to carry out this improvement to develop compact, high performance dehumidifying membranes and/or humidifying membranes with high efficiency, due to an increased permeation rate of water vapor through the membranes.

For membranes with an asymmetric structure, however, when it is attempted to further reduce the permeation resistance for membrane permeating components passing through the membrane, by simply reducing the porous layer thickness or increasing the porosity of the porous layer, in order to increase the permeation rate of the permeate gases passing through the membrane, the permeation rate is successfully increased but at the expense of the membrane support function performed by the porous layer, i.e., the mechanical strength. For this reason, it has been difficult to obtain practical, high performance gas separation membranes having both an improved permeation rate for permeation of permeate gases through the membrane, and mechanical strength at a level suitable for actual use as an asymmetric hollow fiber membrane for an industrial module, i.e., a practical level of mechanical strength.

In addition, when gas separation membranes have been used for dehumidifying or humidifying, membranes with inferior water resistance and hot water resistance are problematic as they cannot be used stably overlong periods and their uses are limited. Efforts have therefore also been directed toward developing dehumidifying membranes and/or humidifying membranes with excellent water resistance and hot water resistance.

BRIEF SUMMARY OF THE INVENTION

The present invention has been achieved in light of the circumstances described above, and it is the result of the discovery by the present inventors that, by forming an asymmetric membrane using a blend of two or more different polymers including at least one type of polyimide, it is possible to produce a gas separation membrane with low permeation resistance (a high permeation rate) for permeate gases passing through the porous layer of the membrane, which also maintains a practical level of mechanical strength of the membrane and has excellent water resistance and hot water resistance.

In other words, the present invention relates to a gas separation membrane with an asymmetric structure comprising a skin layer (selective layer) and a porous layer (support layer), a water vapor permeation rate ($P'_{H2O}$) of $2.5 \times 10^{-3}$ cm$^3$ (STP)/cm$^2 \cdot$sec$\cdot$cmHg or greater and a water vapor and nitrogen permeation rate ratio ($P'_{H2O}/P'_{N2}$) of 50 or greater, wherein the helium gas permeation rate ($P'_{He}$) of the porous layer (support layer) of the membrane is $3.0 \times 10^{-3}$ cm$^3$ (STP)/cm$^2 \cdot$sec$\cdot$cmHg or greater, the tensile strength as a hollow fiber membrane is 2.5 kgf/mm$^2$ or greater and the breaking elongation is 10% or greater.

The invention further relates to the aforementioned gas separation membrane wherein the breaking elongation of the hollow fiber membrane after hot water treatment in 100° C. hot water for 50 hours is at least 80% of that prior to the hot water treatment.

The invention still further relates to the aforementioned gas separation membrane which is formed with a blend of two or more different polymers including at least one polyimide.

The invention still further relates to a dehumidification method which employs the gas separation membrane, to a humidification method which employs the gas separation membrane, and to a dehumidification method and/or humidification method which comprises dehumidification and/or humidification of a fuel cell supply gas using the gas separation membrane.

DETAILED DESCRIPTION OF THE INVENTION

According to the invention, the water vapor permeation rate ($P'_{H2O}$), the water vapor and nitrogen permeation rate ratio ($P'_{H2O}/P'_{N2}$) of the membrane and the helium permeation rate ($P'_{He}$) of the porous layer (support layer) of the membrane are defined as those at 50° C.

Also according to the invention, the helium permeation rate ($P'_{He}$) of the porous layer (support layer) of the membrane is used to indicate the gas permeation resistance of the porous layer (support layer) of the membrane (with a larger value indicating lower resistance), and it is defined as the value measured by the following measurement method. That is, it is the helium gas permeation rate ($P'_{He}$) obtained when the skin layer on the surface of the asymmetric hollow fiber membrane is removed by oxygen plasma treatment and the permeation rate ratio for helium gas and nitrogen gas reaches a range that substantially cannot be recognized as the permeation rate ratio of a homogeneous dense membrane. Specifically, it is the helium gas permeation rate obtained when a membrane with-a helium and nitrogen permeation rate ratio ($P'_{He}/P'_{N2}$) of 20 or greater prior to plasma treatment is plasma treated and the permeation rate ratio ($P'_{He}/P'_{N2}$) is reduced to 1.2 or less. A large value for the helium gas permeation rate ($P'_{He}$) signifies a low gas permeation resistance for the porous layer of the membrane, and a small value for the helium gas permeation rate ($P'_{He}$) signifies a high gas permeation resistance for the porous layer of the membrane.

The mechanical strength according to the invention is represented by the tensile strength and breaking elongation in a tensile test of a hollow fiber membrane. These are the values measured using a tensile tester at a temperature of 23° C., with an effective sample length of 20 mm and a stretching rate of 10 mm/min. The tensile strength is the value obtained by dividing the stress at breakage of the hollow fiber membrane by the cross-sectional area of the hollow fiber membrane [units: kgf/mm$^2$], and the breaking elongation is defined as $(L-L_0)/L_0 \times 100$ [units: %] where $L_0$ is the length of the original hollow fibers and L is their length at breakage.

According to the invention, the water resistance and hot water resistance of a hollow fiber membrane are referred to the retention of breaking elongation in a tensile test after 50 hours of hot water treatment at a temperature of 100° C., expressed in units of %.

The asymmetric gas separation membrane of the invention has a lower gas permeation resistance (higher gas permeation rate) of the porous layer and therefore an improved permeation rate of the membrane for permeate gases (particularly water vapor), and mechanical strength of a level suitable for actual use as an asymmetric hollow fiber membrane for an industrial module, i.e., a practical level of mechanical strength.

In other words, the present invention is directed to an asymmetric gas separation membrane wherein the gas permeation rate of the porous layer is $3.0 \times 10^{-3}$ cm$^3$ (STP)/cm$^2 \cdot$sec$\cdot$cmHg or greater in terms of the helium gas permeation rate ($P'_{He}$) and the tensile strength of the hollow fiber membrane is 2.5 kgf/mm$^2$ or greater and the breaking elongation is 10% or greater, in order to provide a high water vapor permeation rate ($P'_{H2O}$) of $2.5 \times 10^{-3}$ cm$^3$ (STP)/cm$^2 \cdot$sec$\cdot$cmHg or greater, as well as excellent pressure resistance as a hollow fiber membrane and a practical level of mechanical strength suitable for working into industrial gas separation membrane modules.

If the gas permeation rate of the porous layer of the membrane is $3.0 \times 10^{-3}$ (STP)/cm$^2 \cdot$sec$\cdot$cmHg or greater and more preferably $3.5 \times 10^{-3}$ cm$^3$ (STP)/cm$^2 \cdot$sec$\cdot$cmHg or greater in terms of the helium gas permeation rate ($P'_{He}$), the gas permeation resistance of the porous layer is reduced and its effect on the gas permeation performance of the membrane is minimized or substantially negligible, and it is possible to easily obtain a gas separation membrane with a water vapor permeation rate ($P'_{H2O}$) of $2.5 \times 10^{-3}$ cm$^3$ (STP)/cm$^2$·sec·cmHg or greater. Conversely, if the gas permeation rate of the porous layer of the membrane is less than $3.0 \times 10^{-3}$ cm$^3$ (STP)/cm$^2$·sec·cmHg or greater in terms of the helium gas permeation rate ($P'_{He}$), the gas permeation resistance of the porous layer is increased making it difficult to increase the gas permeation rate of the membrane, and hampering efforts to obtain a high performance gas separation membrane with an improved water vapor permeation rate.

The invention is also directed to a gas separation membrane having an asymmetric structure with a tensile strength of 2.5 kgf/mm$^2$ or greater and preferably 3.0 kgf/mm$^2$ or greater, and a breaking elongation of 10% or greater and preferably 15% or greater, as a hollow fiber membrane. Hollow fiber membranes with this level of mechanical strength can be handled without being easily damaged or broken, and are therefore suitable for industrial modules (assembly and working into gas separation membrane modules). Gas separation membrane modules utilizing hollow fiber membranes with such mechanical strength are particularly useful because of their superior pressure resistance and durability. On the other hand, when the tensile strength is under 2.5 kgf/mm$^2$ or the breaking elongation is less than 10%, the hollow fiber membranes are prone to damage or breakage during assembly or working of the gas separation membrane module, thus making it difficult to accomplish assembly and working into an industrial separation membrane module, or even if a separation membrane module is made it will have limited applications and conditions of use due to low pressure resistance. The hollow fiber membranes in the separation membrane module also undergo continuous or intermittent deformation stress, and therefore a tensile strength of less than 2.5 kgf/mm$^2$ or a breaking elongation of less than 10% will tend to result in more problems of damage or breakage.

The present invention is also directed to a gas separation membrane with a water vapor and nitrogen permeation rate ratio ($P'_{H2O}/P'_{N2}$) of 50 or greater. A water vapor and nitrogen permeation rate ratio ($P'_{H2O}/P'_{N2}$) of 50 or greater means at least a practical level of gas selectivity and, particularly, a permselectivity of water vapor making it possible to easily obtain dry air with a dew point of below −15° C., and is useful for a dehumidifying membrane or a humidifying membrane.

The gas separation membrane of the invention also exhibits excellent water resistance and hot water resistance in addition to an improved gas permeation rate and mechanical strength at or above a practical level. That is, the gas separation membrane of the invention exhibits water resistance and hot water resistance whereby the breaking elongation of the hollow fiber membranes even after hot water treatment in 100° C. hot water for 50 hours is retained at at least 80%, and preferably at at least 90%, of that prior to the hot water treatment. The gas separation membrane of the invention can therefore be used as a humidifying membrane and/or dehumidifying membrane for a wide range of purposes, and can maintain high performance even when used for extended periods.

The gas separation membrane of the invention may be obtained by using a blend of two or more different polymers including at least one type of polyimide, and preferably it is obtained by forming a membrane with a blend comprising at least two different polyimides. Increasing the porosity of the porous layer with one type of polyimide can improve the gas permeation rate, but because the mechanical strength is lowered it is not possible to obtain a gas separation membrane according to the invention. The "one type of polyimide" includes both "homopolyimides" and also copolymer polyimides which are polyimides wherein a specific monomer composition is polymerized as a repeating unit. According to the invention, there are no particular restrictions on polymers other than polyimides that can form blends of two or more polymers containing at least one type of polyimide, and there may be mentioned aromatic polyamides, aromatic polyamideimides, aromatic polyetherimides, aromatic polysulfones and aromatic polycarbonates.

A blend of two or more different polymers containing at least one type of polyimide used for the invention is a polymer blend containing at least one type of polyimide with high selectivity, a high degree of separation and a high permeation rate, and at least one type of a polyimide or a polymer other than a, polyimide with excellent mechanical strength. Such polymer blends are soluble in the same solvents. Solutions of the polymer blends in solvents are preferably those which do not produce visible turbidity. A gas separation membrane according to the invention cannot be obtained by using a polymer blend solution which is clearly non-homogeneous in appearance. The gas separation membrane of the invention can be produced using a polymer solution in which the aforementioned polymer blend is dissolved, employing the method proposed by Loeb et al. (for example, U.S. Pat. No. 3,133,132), i.e. the "dry-wet spinning method" in which the polymer blend solution is extruded from a nozzle into the desired shape, and then immersed in a coagulation bath after passing through an air or nitrogen atmosphere. In the coagulation step of the dry-wet spinning method, phase separation of the polymer phase and solvent phase is promoted by replacing the solvent of the polymer solution with a poor solvent for the polymer in the coagulation bath, thus giving the polymer a porous structure. In the case of the coagulation step for a solution of a polymer blend according to the invention, it is conjectured that, in addition to the promoted phase separation into the polymer phase and solvent phase, separation of each polymer phase is also promoted in the polymer blend including at least one type of polyimide, thus further increasing the porosity while forming a porous structure with minimal reduction in mechanical strength. If the membrane is formed not with the polymer blend but using one type of copolymerized polymer comprising the same monomer composition as the polymer blend, it is not possible to obtain a high performance gas separation membrane with both an improved gas permeation rate and a practical level of mechanical strength.

More specifically, the method of producing the gas separation membrane of the invention is as follows. A polymer blend solution is prepared by dissolving two or more different polymers including one type of polyimide in the same solvent, extruding it from a nozzle into the desired shape such as a hollow fiber shape and passing it through air or a nitrogen atmosphere immediately after extrusion, subsequently immersing it in a coagulation solvent that substantially does not dissolve the polymer blend and is compatible with the solvent of the polymer blend solution to form an asymmetric structure. The obtained asymmetric membrane is then subjected to drying and heat treatment to produce a separation membrane. The polymer blend solution may be made by separately preparing solutions of the two or more different polymers and then mixing them, or by dissolving the two or more different polymers including one type of polyimide in the same solvent one after the other. The concentration of the polymer blend solution is preferably 10–25 wt % for production of a membrane. The solution viscosity (rotational viscosity) of the polymer blend solution extruded from the nozzle is preferably 50–15,000 poise and especially 100–10,000 poise at the extrusion temperature, since this can give a stable shape after extrusion of the hollow fiber or other shape. The immersion in the coagulation bath preferably involves immersion in a primary coagulation bath for coagulation into a hollow fiber or other membrane shape, followed by winding onto a guide roll and then immersion in a secondary coagulation bath to fully coagulate the entire membrane. Drying of the coagulated membrane can be efficiently accomplished by a method in which the replacement of the coagulation solvent using a solvent such as a hydrocarbon is followed by drying. The heat treatment is preferably carried out at a temperature lower than the softening points or glass transition temperatures of the two or more different polymers including one type of polyimide.

The thickness of the skin layer of the gas separation membrane of the invention is 10–200 nm, and preferably 20–100 nm. The thickness of the porous layer of the gas separation membrane of the invention is 20–200 $\mu$m, and preferably 30–100 $\mu$m. A skin layer thickness of less than 10 nm will hamper production, while a thickness of over 200 nm reduces the gas permeation rate and may make it impossible to obtain a gas separation membrane according to the invention. A porous layer thickness of less than 20 $\mu$m reduces the mechanical strength and thus the support function, while a thickness of over 200 $\mu$m increases the gas permeation resistance of the porous layer and may make it impossible to obtain a gas separation membrane with an improved gas permeation rate.

The gas separation membrane of the invention may be suitably used as a hollow fiber membrane, and the inner diameter of the hollow fiber membrane is preferably 30–500 $\mu$m. Hollow fiber membranes of the invention can be suitably used by incorporation into an ordinary gas separation membrane module. For example, the hollow fiber membranes may be bundled at about 100–200,000 fibers with an appropriate length. The manner of bundling may be in a parallel arrangement, a crossing arrangement or a woven fashion, or a core such as a pipe may be placed at roughly the center of the bundle, and the bundle wrapped with a polymer film. The hollow fiber bundle is anchored by a tubesheet in a manner which keeps at least one end of the hollow fiber membranes open, and is inserted into a container with at least a mixed gas inlet, a permeating gas outlet and a non-permeating gas outlet, and then the tube sheet is sealed to the container in a manner which partitions the space in the container. The mixed gas is supplied into the space in contact with the inside or outside of the hollow fiber membranes, and specific components in the mixed gas selectively permeate the membrane, while it flows in contact with the hollow fiber membranes, and are recovered through the permeating gas outlet, while the non-permeating gas which has not passed through is recovered through the non-permeating gas outlet, thus accomplishing gas separation. A carrier gas may also be introduced into the space on the permeating gas side, for example, in a direction countercurrent to the supplied mixed gas, to promote recovery of the permeating gas, and in such a case a non-permeating gas may be used as the carrier gas.

Because the gas separation membrane of the invention has a very high water vapor permeation rate, dehumidification and/or humidification can be accomplished very efficiently and satisfactorily using gas separation membranes according to the invention. For dehumidification, a water vapor-containing mixed gas may be supplied into a gas separation membrane module comprising gas separation membranes of the invention, into the space contacting the inside or outside of the hollow fiber membranes, to allow selective permeation of the water vapor to the permeating side of the membranes and to thus very efficiently obtain dehumidified gas as the non-permeating gas. Supplying the water vapor-containing mixed gas to the inside of the hollow fiber membranes and introducing a dried carrier gas into the space on the outside of the hollow fiber membranes in a countercurrent to the mixed gas is particularly preferred as it allows dehumidification to be accomplished more efficiently, while recycling a portion of the dehumidified gas obtained at the non-permeating side of the gas separation membrane as the carrier gas is also preferred as a convenient method of introducing the carrier gas. For humidification, a mixed gas containing a higher water vapor content (high water vapor partial pressure) may be supplied to the space contacting the inside or outside of the hollow fiber membranes and a gas containing a lower water vapor content (low water vapor partial pressure) may be supplied to the opposite side of the hollow fiber membranes, so that the water vapor passes through the membranes to allow easy humidification, of the gas with the lower water vapor content. For higher efficiency, it is particularly preferred for the gas with the higher water vapor content and the gas with the lower water vapor content to be in countercurrent with each other on each side of the hollow fiber membranes.

A gas separation membrane according to the invention can also be used for highly efficient and satisfactory dehumidification and/or humidification of supply gases for fuel cells. Polymer electrolyte fuel cells (PEFC) are usually constructed by layering generating elements each laminated by sandwiching both sides of a hydrogen ion-conductive solid polymer electrolyte membrane with a carbon electrode carrying a platinum catalyst, and separators provided with a gas-supplying function and a draining function, with a fuel gas such as hydrogen or an oxidizing gas such as oxygen being supplied to the electrodes of each and for discharge of the discharge gas from the electrodes, as well as a collector situated on the outside. In such cells, drying of the polymer electrolyte membrane drastically reduces the output due to poor ion-conductivity, and it is therefore important to maintain a constant humidity for the solid polymer electrolyte membrane. For this reason, it is essential to subject the supply gas (fuel gas and/or oxidizing gas) to humidification (or instead to dehumidification in cases of a high water content). The use of separation membranes for humidification of supply gas has already been proposed. Japanese Unexamined Patent Publication No. 3-269958 discloses the use of a porous membrane comprising a tetrafluoroethylene resin. The use of hollow fiber porous membranes to increase the permeation membrane area per unit area and thereby increase humidifying performance is disclosed in Japanese Unexamined Patent Publication No. 8-273687 and Japanese Unexamined Patent Publication No. 8-315838. However, these humidifying membranes have exhibited problems of insufficient humidifying performance, and have presented an inconvenience in that prolonged contact between water and the membrane produces water droplets as the water seeps through to the fuel cell supply gas side of the membrane. For fuel cells destined for automobiles and the like, it has been attempted to selectively remove the water from the discharge gas of the fuel cell using a separation membrane, for recycling to the supply gas of the fuel cell; a problem has existed, however, in that with the aforementioned porous membrane, components other than water in the discharge gas of the fuel cell contaminate the supply gas of the fuel cell.

Because of the very high water vapor permeation rate of the gas separation membrane of the invention, it can perform humidification and/or dehumidification in an efficient manner. The gas separation membrane of the invention is a membrane formed using a blend of two or more different polymers including at least one type of polyimide, and preferably it is a membrane formed using a blend of two or more different polyimides; it therefore has excellent heat resistance and chemical resistance as required for fuel cell use. The gas separation membrane of the invention is also satisfactorily resistant to hot water at temperatures of around 100° C. at which solid polymer fuel cells operate. Furthermore, since the gas separation membrane of the invention has an asymmetric structure comprising a skin layer (selective layer) and a porous layer (support layer), it can be used for extended periods with fuel cells without being prone to the problems of water droplet formation caused by water seeping out to the fuel cell supply gas side of the membrane, or contamination of the fuel cell supply gas by components other than water in the fuel cell discharge gas. By using a gas separation membrane according to the invention it is possible to very satisfactorily accomplish dehumidification and/or humidification of supply gas for fuel cells.

Production of a hollow fiber gas separation membrane according to the invention and its properties will now be explained in detail. It is to be understood, however, that the invention is in no way limited to these examples.

Preparation of a Polyimide A Solution with Polymer Concentration of 12 wt %

In a separable flask, 29.422 g of 3,3',4,4'-biphenyltetracarboxylic dianhydride (hereunder sometimes abbreviated as s-BPDA), 44.202 g of 2,2'-bis(3,4-dicarboxyphenyl)hexafluoropropane dianhydride (hereunder sometimes abbreviated as 6FDA) and 54.868 g of dimethyl-3,7-diamino-dibenzothiophene-5,5-dioxide (hereunder sometimes abbreviated as TSN) were polymerized together with 889.42 g of a p-chlorophenol (hereunder sometimes abbreviated as PCP) solvent at a polymerization temperature of 180° C. for 4 hours, to obtain polyimide A solution with a rotational viscosity of 1500 poise and a polymer concentration of 12 wt %.

Preparation of Polyimide B Solution with Polymer Concentration of 13 wt %

In a separable flask, 28.245 g of s-BPDA, 24.691 g of TSN and 2.002 g of 4,4'-diaminodiphenylether (hereunder abbreviated as 4,4'DADE) were polymerized together with 343.54 g of a PCP solvent at a polymerization temperature of 180° C. for 4 hours, to obtain polyimide B solution with a rotational viscosity of 1500 poise and a polymer concentration of 13 wt %.

Preparation of Polyimide C Solution with Polymer Concentration of 12 wt %

In a separable flask, 29.422 g of s-BPDA, 44.202 g of 6FDA, 27.434 g of TSN and 32.220 g of 2,2',5,5'-tetrachloro-4,4'-diaminobiphenyl (hereunder sometimes abbreviated as TCB) were polymerized together with 924.57 g of PCP solvent at a polymerization temperature of 180° C. for 8 hours, to obtain a polyimide C solution with a rotational viscosity of 1200 poise and a polymer concentration of 12 wt %.

Preparation of Polyimide D Solution with Polymer Concentration of 12.3 wt %

In a separable flask, 19.124 g of s-BPDA, 15.315 g of 6FDA, 26.611 g of TSN and 0.601 g of DADE were polymerized together with 413.88 g of PCP solvent at a polymerization temperature of 180° C. for 4 hours, to obtain a polyimide D solution with a rotational viscosity of 1300 poise and a polymer concentration of 12.3 wt %. The monomer component composition of polyimide D was approximately equivalent to the composition of a mixed monomer component of equivalent weights of polyimide A and polyimide B.

Preparation of a Polyimide E Solution with a Polymer Concentration of 14 wt %

In a separable flask, 29.422 g of S-BPDA, 44.424 g of 6FDA, 16.179 g of DADE and 35.432 g of 1,4-bis(4-aminophenoxy)benzene (hereunder sometimes abbreviated as TPEQ) were polymerized together with 726.44 g of a PCP solvent at a polymerization temperature of 180° C. for 17 hours, to obtain a polyimide E solution with a rotational viscosity of 1748 poise and a polymer concentration of 14 wt %.

Preparation of a Polyimide F Solution with Polymer Concentration of 14 wt %

In a separable flask, 88.266 g of s-BPDA and 60.973g of DADE were polymerized together with 850.41 g of PCP solvent at a polymerization temperature of 180° C. for 10 hours, to obtain a polyimide F solution with a rotational viscosity of 1730 poise and a polymer concentration of 14 wt %.

Preparation of a Polyimide G Solution with Polymer Concentration of 14 wt %

In a separable flask, 44.133 g of s-BPDA, 66.636 g of 6FDA and 60.432 g of DADE were polymerized together with 985.32 g of a PCP solvent at a polymerization temperature of 180° C. for 12 hours, to obtain a polyimide G solution with a rotational viscosity of 1674 poise and a polymer concentration of 14 wt %.

Production of Asymmetric Hollow Fiber Membrane

A polyimide solution or a polyimide blend solution was filtered with a 400 mesh wire net and then extruded from a hollow fiber membrane spinning nozzle (1000 $\mu$m circular opening diameter, 200 $\mu$m circular opening slit width, 400 $\mu$m core opening diameter), and the extruded hollow fiber body was passed through a nitrogen atmosphere and then immersed in a coagulation bath comprising an aqueous ethanol solution with a prescribed concentration (70–80 wt %) at a temperature of 0° C. to make wet fibers. These were immersed for 2 hours in ethanol at a temperature of 50° C. to complete the desolvating treatment, and after further immersion for 3 hours in isooctane at a temperature of 70° C. to replace the solvent, it was dried at a temperature of 100° C. to thorough dryness and then subjected to heat treatment for one hour at a prescribed temperature (200–300° C.). All of the resulting hollow fiber membranes had an outer diameter dimension of approximately 470 $\mu$m, an inner diameter dimension of approximately 320 $\mu$m and a membrane thickness of approximately 75 $\mu$m.

Measurement of Water Vapor Permeation Performance of Hollow Fiber Membranes

About 10 hollow fiber membranes, a stainless steel pipe and an epoxy resin-based adhesive were used to fabricate a permeation performance evaluating element with an effective length of 20 mm, which was inserted into a stainless steel container to make a pencil module. Nitrogen gas with a water vapor content of 1500 ppm was supplied at a fixed rate to the outside of the hollow fibers of the pencil module, and water vapor separation was carried out while introducing a carrier gas (Ar gas) at a fixed rate to the permeating side, with the water vapor contents of the non-permeating gas and permeating gas being detected using a dew-point measuring apparatus. The water vapor permeation rate for the membranes was calculated from the measured water vapor contents (water vapor partial pressures) and the supply gas rate and effective membrane area. The measurements were made at 50° C.

Measurement of Nitrogen Gas Permeation Performance of Hollow Fiber Membranes

About 15 hollow fiber membranes, a stainless steel pipe and an epoxy resin-based adhesive were used to fabricate a permeation performance evaluating element with an effective length of 10 cm, which was introduced into a stainless steel container to make a pencil module. Nitrogen gas at a fixed pressure was supplied and the permeation-flow rate was measured. The nitrogen gas permeation rate was calculated from the measured permeating nitrogen gas volume and the supply pressure and effective membrane area. The measurements were made at 50° C.

Measurement of Helium Gas Permeation Performance by Porous Layer of Hollow Fiber Membranes A plurality of hollow fiber membranes were evenly spread out in a plasma treatment apparatus and subjected to an oxygen plasma treatment at an application voltage of 20 V. Some of the hollow fibers (several membranes) were taken out every 5 minutes during the oxygen plasma treatment, in order to obtain hollow fiber membranes with different plasma treatment times. The hollow fiber membranes were used to construct a pencil module (effective length: 10 mm) for gas permeation measurement by the same method described above, pure nitrogen gas or pure helium gas was supplied thereto at a fixed volume and pressure to measure the permeating flow volume of each, and the permeation rates for nitrogen and helium were calculated from the measured permeating flow volumes, supply pressures and effective membrane area. Since the $P'_{He}/P'_{N2}$ ratios, which are the ratios of these values for the hollow fiber membranes which were plasma treated for 20 minutes or longer, were no higher than 1.2, the helium permeation rates ($P'_{He}$) for the hollow fiber membranes treated for 20 minutes were used as the helium permeation rates for the porous layers of the membranes used for the invention. The measurements were made at 50° C.

Measurement of Tensile Strength and Breaking Elongation of Hollow Fiber Membranes A tensile tester was used for measurement with an effective sample length of 20 mm and a stretching rate of 10 mm/min. The fractured surface area was calculated upon measuring the dimensions of the fracture cross-section using a light microscope.

Measurement of Rotational Viscosity

The rotational viscosity of the polyimide solution was measured at a temperature of 100° C. using a rotational viscometer (rotor shear rate: 1.75/sec).

Measurement of Water Resistance and Hot Water Resistance of Hollow Fiber Membranes Hollow fiber membranes with known breaking elongation values were used as samples, and the hollow fiber membranes were placed in a stainless steel container with ion-exchange water and sealed, after which the container was placed in an oven at 100° C. and held there for 50 hours for hot water treatment of the hollow fiber membranes. After the hot water treatment, the hollow fiber membranes-were removed from the container and dried in an oven at 100° C. The breaking elongation of the dried hollow fiber membranes was measured according to the tensile test described above. The water resistance and hot water resistance were each represented in terms of the breaking elongation retention [%].

EXAMPLE 1

A polyimide blend solution was prepared by stirring 583.3 g of a polyimide A solution with a polymer concentration of 12.0 wt % and 250 g of polyimide B solution with a polymer concentration of 13.0 wt % in a separable flask at 130° C. for 3 hours. The polymer concentration of the blend solution was 12.3 wt %, and the rotational viscosity was 1500 poise. The polyimide blend solution was used to produce a hollow fiber membrane by the aforementioned asymmetric hollow fiber membrane production method. The gas permeation performance and mechanical properties of the hollow fiber membrane were measured by the methods described above. The results are shown in Table 1.

EXAMPLE 2

A mixed solution was prepared by combining 400 g of a polyimide A-solution with a polymer concentration of 12.0 wt % and 400 g of polyimide B solution with a polymer concentration of 13.0 wt % by the same mixing method as in Example 1. The polymer concentration of the blend solution was 12.5 wt %. The polyimide blend solution was used to produce a hollow fiber membrane by the aforementioned asymmetric hollow fiber membrane production method. The gas permeation performance and mechanical properties of the hollow fiber membrane were measured by the methods described above. The results are shown in Table 1.

COMPARATIVE EXAMPLE 1

A Polyimide A solution was used to produce a hollow fiber membrane by the aforementioned asymmetric hollow fiber membrane production method. The gas permeation performance and mechanical properties of the hollow fiber membrane were measured by the methods described above. The results are shown in Table 1.

COMPARATIVE EXAMPLE 2

A Polyimide B solution with a polymer concentration of 13.0 wt % was used to produce a hollow fiber membrane by the aforementioned asymmetric hollow fiber membrane production method. The gas permeation performance and mechanical properties of the hollow fiber membrane were measured by the methods described above. The results are shown in Table 1.

COMPARATIVE EXAMPLE 3

A Polyimide D solution with a polymer concentration of 12.3 wt % was used to produce a hollow fiber membrane by the aforementioned asymmetric hollow fiber membrane production method. The gas permeation performance and mechanical properties of the hollow fiber membrane were measured by the methods described above. The results are shown in Table 1.

EXAMPLE 3

A mixed solution was prepared by combining 350 g of a polyimide C solution with a polymer concentration of 12.0 wt % and 150 g of a polyimide B solution-with a polymer concentration of 13.0 wt % by the same mixing method as in EXAMPLE 1. The polymer concentration of the blend solution was 12.3 wt %. The polyimide blend solution was used to produce a hollow fiber membrane by the aforementioned asymmetric hollow fiber membrane production method. The gas permeation performance and mechanical properties of the hollow fiber membrane were measured by the methods described above. The results are shown in Table 1.

EXAMPLE 4

A mixed solution was prepared by combining 280 g of a polyimide E solution and 120 g of a polyimide F solution by the same mixing method as in Example 1. The polymer concentration of the blend solution was 14 wt %, and the rotational viscosity was 1786 poise. The polyimide blend solution was used to produce a hollow fiber membrane by the aforementioned asymmetric hollow fiber membrane production method. The gas permeation-performance and mechanical properties of the hollow fiber membrane were measured by the methods described above. The results are shown in Table 2.

EXAMPLE 5

A mixed solution was prepared by combining 360 g of a polyimide E solution and 40 g of a polyimide F solution by the same mixing method as in Example 1. The polymer concentration of the blend solution was 14 wt %, and the rotational viscosity was 1804 poise. The polyimide blend solution was used to produce a hollow fiber membrane by the aforementioned asymmetric hollow fiber-membrane production method. The gas permeation performance and mechanical properties of the hollow fiber membrane were measured by the methods described above. The results are shown in Table 2.

COMPARATIVE EXAMPLE 4

Polyimide AE solution was used to produce a hollow fiber membrane by the aforementioned asymmetric hollow fiber membrane production method. The gas permeation performance and mechanical properties of the hollow fiber membrane were measured by the methods described above. The results are shown in Table 2.

COMPARATIVE EXAMPLE 5

Polyimide AF solution was used to produce a hollow fiber membrane by the aforementioned asymmetric hollow fiber membrane production method. The gas permeation performance and mechanical properties of the hollow fiber membrane were measured by the methods described above. The results are shown in Table 2.

EXAMPLE 6

A mixed solution was prepared by combining 240 g of polyimide G solution and 160 g a of polyimide F solution by the same mixing method as in Example 1. The polymer concentration of the blend solution was 14 wt %, and the rotational viscosity was 1748 poise. The polyimide blend solution was used to produce a hollow fiber membrane by the aforementioned asymmetric hollow fiber membrane production method. The gas permeation performance and mechanical properties of the hollow fiber membrane were measured by the methods described above. The results are shown in Table 2.

EXAMPLE 7

A mixed solution was prepared by combining 280 g of a polyimide G solution and 120 g of a polyimide F solution by the same mixing method as in Example 1. The polymer concentration of the blend solution was 14 wt %, and the rotational viscosity was 1786 poise. The polyimide blend solution was used to produce a hollow fiber membrane by the aforementioned asymmetric hollow fiber membrane production method. The gas permeation performance and mechanical properties of the hollow fiber membrane were measured by the methods described above. The results are shown in Table 2.

EXAMPLE 8

A mixed solution was prepared by combining 360 g of a polyimide G solution and 40 g of a polyimide F solution by the same mixing method as Example 1. The polymer concentration of the blend solution was 14 wt %, and the rotational viscosity was 1693 poise. The polyimide blend solution was used to produce a hollow fiber membrane by the aforementioned asymmetric hollow fiber membrane production method. The gas permeation performance and mechanical properties of the hollow fiber membrane were measured by the methods described above. The results are shown in Table 2.

Tables 1 and 2 show the results for the measurements of the water vapor permeation rates, water vapor and nitrogen permeation rate ratios, the hollow fiber membrane mechanical strength, the porous layer helium permeation rates and the hot water resistance for the hollow fiber membranes of the examples and comparative examples. The gas separation membranes of Examples 1–8 had a water vapor permeation rate ($P'_{H2O}$) of $2.5 \times 10^{-3}$ cm$^3$ (STP)/cm$^2$·sec·cmHg or greater and a water vapor and nitrogen permeation rate ratio ($P'_{H2O}/P'_{N2}$) of 50 or greater, a porous layer helium gas permeation rate ($P'_{He}$) of $3.0 \times 10^{-3}$ cm$^3$ (STP)/cm$^2$·sec·cmHg or greater, a tensile strength of 2.5 kgf/mm$^2$ or greater and a breaking elongation of 10% or greater, as hollow fiber membranes. The gas separation membranes have excellent improved water vapor permeation rates and a practical level of mechanical strength, and can therefore be easily worked into separation membrane modules. However, the gas separation membranes of Comparative Examples 1 and 4, while having excellent porous layer helium permeation rates and membrane water vapor permeation rates, had a tensile strength of less than 2.5 kgf/mm$^2$ and a breaking elongation of less than 10% as hollow fiber membranes, and thus lacked a practical level of mechanical strength rendering them poorly suitable for industrial working into separation membrane modules. The gas separation membranes of Comparative Examples 2 and 5 had a practical level of mechanical strength as hollow fiber membranes, but the porous layer helium permeation rates and membrane water vapor permeation rates were low. The gas separation membrane of Comparative Example 3 was a hollow fiber membrane composed of polyimide D which was obtained by polymerization of a monomer component composition identical to a monomer component composition comprising a mixture of equivalent weights of polyimide A and polyimide B, but the breaking elongation of the hollow fiber membrane was less than 10% and the mechanical strength was not of a practical level, rendering it poorly suitable for industrial working into a separation membrane module. The gas separation membrane of Comparative Example 3 had a lower water vapor permeation rate than the gas separation membrane formed of a mixture of polyimide A and polyimide B (gas separation membrane of Example 2).

The gas separation membranes of Examples 4 to 8 also had very excellent water resistance and hot water resistance.

TABLE 1

| | Polyimide components and concentrations of polyimide blend solution | | | Gas separation membrane performance of hollow fiber membranes | | | | |
|---|---|---|---|---|---|---|---|---|
| | First component (polyimide concentration) | Second component (polyimide concentration) | Blend composition (polyimide concentration) | $P'_{H2O}$ | $P'_{H2O}/P'_{N2}$ | Tensile strength | Breaking elongation | $P'_{He}$ of porous layer |
| Example 1 | Polyimide A BPDA, 6FDA TSN (12.0 wt %) | Polyimide B BPDA TSN, DADE (13.0 wt %) | A/B =70/30 (12.3 wt %) | 3.5 | 200 | 3.3 | 13 | 4.5 |
| Example 2 | Polyimide A BPDA, 6FDA TSN (12.0 wt %) | Polyimide B BPDA TSN, DADE (13.0 wt %) | A/B =50/50 (12.5 wt %) | 3.1 | 700 | 4.9 | 20 | 3.8 |
| Comp. Ex. 1 | | Polyimide A BPDA, 6FDA TSN (12.0 wt %) | A = 100 (12.0 wt %) | 3.7 | 180 | 1.4 | 5 | 4.1 |
| Comp. Ex. 2 | | Polyimide B BPDA TSN, DADE (13.0 wt %) | B = 100 (13.0 wt %) | 1.6 | 1600 | 6.0 | 29 | 2.2 |
| Comp. Ex. 3 | | Polyimide D BPDA, 6FDA TSN, DADE (12.3 wt %) | D = 100 Copolymer of monomer components A and B (12.3 wt %) | 2.8 | 350 | 3.6 | 6 | 4.0 |
| Example 3 | Polyimide C BPDA, 6FDA TSN, TCB (12.0 wt %) | Polyimide B BPDA TSN, DADE (13.0 wt %) | C/B =70/30 (12.3 wt %) | 3.4 | 320 | 3.1 | 11 | 4.2 |

Note: The units for $P'_{H2O}$ and the porous layer $P'_{He}$ were $[\times 10^{-3} \text{cm}^3 \text{ (STP)}/\text{cm}^2 \cdot \text{sec} \cdot \text{cmHg}]$.
The units for the tensile strength were $[\text{kgf/mm}^2]$.
The units for the breaking elongation were [%].

TABLE 2

| | Polyimide components and concentrations of polyimide blend solution | | | Gas separation membrane performance of hollow fiber membranes | | | | | |
|---|---|---|---|---|---|---|---|---|---|
| | First component (polyimide concentration) | Second component (polyimide concentration) | Blend composition (polyimide concentration) | $P'_{H2O}$ | $P'_{H2O}/P'_{N2}$ | Tensile strength | Breaking elongation | $P'_{He}$ of porous layer | Hot water resistance |
| Example 4 | Polyimide E BPDA, 6FDA DADE, TPEQ (14.0 wt %) | Polyimide F BPDA DADE (14.0 wt %) | E/F =70/30 (14.0 wt %) | 2.7 | 120 | 5.1 | 92 | 3.1 | 99 |
| Example 5 | Polyimide E BPDA, 6FDA DADE, TPEQ (14.0 wt %) | Polyimide F BPDA DADE (14.0 wt %) | E/F =90/10 (14.0 wt %) | 3.1 | 127 | 3.0 | 30 | 3.4 | 94 |
| Comp. Ex. 4 | | Polyimide E BPDA, 6FDA DADE, TPEQ (14.0 wt %) | E = 100 (14.0 wt %) | 2.9 | 77 | 2.1 | 8 | 3.3 | — |
| Comp. Ex. 5 | | Polyimide F BPDA DADE (14.0 wt %) | F = 100 (14.0 wt %) | 0.9 | 316 | 8.6 | 126 | 1.3 | — |

TABLE 2-continued

| | Polyimide components and concentrations of polyimide blend solution | | Blend composition (polyimide concentration) | Gas separation membrane performance of hollow fiber membranes | | | | | |
|---|---|---|---|---|---|---|---|---|---|
| | First component (polyimide concentration) | Second component (polyimide concentration) | | $P'_{H2O}$ | $P'_{H2O}/P'_{N2}$ | Tensile strength | Breaking elongation | $P'_{He}$ of porous layer | Hot water resistance |
| Example 6 | Polyimide G BPDA, 6FDA DADE (14.0 wt %) | Polyimide F BPDA DADE (14.0 wt %) | G/F =60/40 (14.0 wt %) | 2.7 | 473 | 7.3 | 124 | 3.1 | 92 |
| Example 7 | Polyimide G BPDA, 6FDA DADE (14.0 wt %) | Polyimide F BPDA DADE (14.0 wt %) | G/F =70/30 (14.0 wt %) | 3.4 | 588 | 4.3 | 62 | 4.0 | 92 |
| Example 8 | Polyimide G BPDA, 6FDA DADE (14.0 wt %) | Polyimide F BPDA DADE (14.0 wt %) | G/F =90/10 (14.0 wt %) | 3.1 | 110 | 3.6 | 26 | 3.6 | 98 |

Note: The units for $P'_{H2O}$ and $P'_{He}$ were [$\times 10^{-3}$ $cm^3$ (STP)/$cm^2 \cdot sec \cdot cmHg$].
The units for the tensile strength were [kgf/mm$^2$].
The units for the breaking elongation were [%].
The hot water resistance is the retention of the initial breaking elongation after treatment for 50 hours in hot water at 100° C., expressed in units of [%].

A gas separation membrane of the invention is an asymmetric membrane with an improved gas permeation rate, that also exhibits mechanical strength of a level suitable for actual use as an asymmetric membrane for an industrial module, i.e., a practical level of mechanical strength. The gas separation membrane of the invention also exhibits excellent water resistance and hot water resistance. Gas separation membranes of the invention can therefore be used to realize high efficiency gas separation by providing a more compact and more efficient high performance hollow fiber gas separation membrane module, due to an improved gas separation rate. The gas separation membrane of the invention may be obtained by forming a membrane with an asymmetric structure using a mixture of two or more different polymers including at least one type of polyimide.

In particular, a gas separation membrane of the invention can be used to very efficiently accomplish dehumidification and/or humidification. By using a gas separation membrane according to the invention it is possible to carry out very satisfactory dehumidification and/or humidification of a supply gas for polymer electrolyte fuel cells.

We claim:

1. A gas separation membrane with an asymmetric structure comprising:
    a skin layer and a porous support layer,
    wherein the membrane has a water vapor permeation rate ($P'_{H2O}$) of at least $2.5 \times 10^{-3}$ cm$^2$(STP)/cm$^3$·sec·cm Hg and a water vapor and nitrogen permeation rate ratio ($P'_{H2O}/P'_{N2}$) of at least 50,
    wherein the porous support layer has a helium gas permeation rate ($P'_{He}$) of at least $3.0 \times 10^{-3}$ cm$^3$ (STP)/cm$^2$·sec·cm Hg, and
    wherein the membrane has, as measured as a hollow fiber membrane, a tensile strength of at least 2.5 kgf/mm$^2$ and a breaking elongation of at least 10%.

2. A gas separation membrane according to claim 1, wherein the breaking elongation of the hollow fiber membrane after hot water treatment in 100° C. hot water for 50 hours is at least 80% of that prior to the hot water treatment.

3. A gas separation membrane according to claim 1, which is formed from a blend of at least two different polymers including at least one polyimide.

4. A gas separation membrane according to claim 1, composed of a hollow fiber membrane.

5. A dehumidification method, comprising:
    directing a water vapor-containing mixed gas into a gas separation membrane module comprising the gas separation membrane of claim 1,
    contacting the water vapor-containing mixed gas with one side of the gas separation membrane, whereby the water vapor in the water vapor-containing mixed gas selectively permeates through the membrane to the opposite side of the membrane, and
    withdrawing the mixed gas depleted in water vapor from the one side of the membrane.

6. A humidification method, comprising:
    directing a mixed gas containing a higher water vapor content and a mixed gas containing a lower water vapor content individually into a gas separation membrane module comprising the gas separation membrane of claim 1,
    contacting the mixed gas containing a higher water vapor content with one side of the gas separation membrane and contacting the mixed gas containing a lower water vapor content with the opposite side of the gas separation membrane, whereby the water vapor in the mixed gas containing a higher water vapor content selectively permeates through the membrane to the opposite side of the membrane, and
    withdrawing the mixed gas enriched in water vapor from the opposite side of the membrane.

7. A humidification method according to claim 6, wherein the mixed gas containing a lower water content is a fuel cell supply gas.

8. A humidification method according to claim 6, wherein the mixed gas containing a higher water content is a fuel cell discharge gas.

* * * * *